United States Patent
Arad et al.

(10) Patent No.: US 9,916,499 B2
(45) Date of Patent: Mar. 13, 2018

(54) METHOD AND SYSTEM FOR LINKING PRINTED OBJECTS WITH ELECTRONIC CONTENT

(71) Applicant: WINK-APP LTD., Kfar HaOranim (IL)

(72) Inventors: Itai Arad, Kfar HaOranim (IL); Tsur Herman, Pardes Chana (IL)

(73) Assignee: WINK-APP LTD., Kfar Horanium (IL)

( * ) Notice: Subject to any disclaimer, the term of this patent is extended or adjusted under 35 U.S.C. 154(b) by 239 days.

(21) Appl. No.: 14/419,172

(22) PCT Filed: Aug. 8, 2013

(86) PCT No.: PCT/IL2013/050679
§ 371 (c)(1),
(2) Date: Feb. 2, 2015

(87) PCT Pub. No.: WO2014/024197
PCT Pub. Date: Feb. 13, 2014

(65) Prior Publication Data
US 2015/0242684 A1   Aug. 27, 2015

Related U.S. Application Data

(60) Provisional application No. 61/681,150, filed on Aug. 9, 2012.

(51) Int. Cl.
*G06K 9/00* (2006.01)
*G06F 17/30* (2006.01)

(52) U.S. Cl.
CPC ... *G06K 9/00456* (2013.01); *G06F 17/30271* (2013.01); *G06F 17/30879* (2013.01);
(Continued)

(58) Field of Classification Search
None
See application file for complete search history.

(56) References Cited

U.S. PATENT DOCUMENTS

| 6,138,151 A | 10/2000 | Reber et al. |
| 8,335,789 B2 * | 12/2012 | Hull ............ G06F 17/30247 707/736 |

(Continued)

FOREIGN PATENT DOCUMENTS

| EP | 2015228 A1 | 1/2009 |
| EP | 2028588 A2 | 2/2009 |

(Continued)

OTHER PUBLICATIONS

T. Arai et al, "Paperlink: A technique for hyperlinking from real paper to electronic content", In Proceedings of the ACM SigChi Conference on Human Factors in Computing Systems, CHI'97, ACM, pp. 1-12, Mar. 31, 1997.

*Primary Examiner* — Bernard Krasnic
(74) *Attorney, Agent, or Firm* — Browdy and Neimark, PLLC

(57) ABSTRACT

A method for linking objects to electronic content is disclosed. The method includes providing a digital copy of a layout of an object; processing the digital copy for distinguishing text objects each associated with a visual form of at least portion of a word or a combination of adjacent words in the layout, and determining bounding boxes of the text objects; coding each text object in a binary descriptor corresponding to its visual form, whereby the coding includes: scaling the bounding box of the text object to a fixed size binary image, and flattening the binary image to form the binary descriptor; representing the layout in a binary vector formed as an array of the binary descriptors of at least the text objects in the layout; and assigning hashwords to the binary descriptors, for converting the binary vector into a searchable text form.

16 Claims, 4 Drawing Sheets

(52) U.S. Cl.
CPC ... *G06F 17/30914* (2013.01); *G06K 9/00463* (2013.01); *G06T 2207/30176* (2013.01)

(56) References Cited

U.S. PATENT DOCUMENTS

2006/0262352 A1\* 11/2006 Hull .................. G06F 17/30247
                                                                               358/1.18
2007/0050360 A1\* 3/2007 Hull ..................... G06F 17/3002
2009/0285444 A1   11/2009 Erol et al.
2014/0044361 A1\* 2/2014 Lee ...................... G06K 9/6211
                                                                               382/201

FOREIGN PATENT DOCUMENTS

WO      2007023993 A1   3/2007
WO      2007/130688 A2   11/2007

\* cited by examiner

METHOD AND SYSTEM FOR LINKING PRINTED OBJECTS WITH ELECTRONIC CONTENT

FIELD OF THE INVENTION

The present invention relates to the field of media services. More particularly, the invention relates to a method and system for providing an intuitive connection between printed media and digital media.

BACKGROUND OF THE INVENTION

Mobile device such as cellular phones are becoming increasingly popular in recent years. The newer generations of the mobile devices e.g., smart phones and tablets, offer enhanced camera specifications, high speed internet connection and a fast internal processor.

An example of a solution for linking between printed materials and electronic content is the use of barcodes. However, barcodes, such as QR code, suffers from major inherent problems as their size and look do not allow having many instances of it in a printed textual page, like hyperlinks commonly are. Having multiple number of barcodes in a page require unacceptable changes to the layout of the page.

It is the intention of this invention to use those enhanced functions to enable such advanced mobile devices become a mediator and a connector between the printed materials and electronic files via the internet.

It is an object of the present invention to offer users the comfort of printed media reading and the updatability and richness of the online media.

It is another object of the present invention to allow multiple "offline hyperlinks" in a printed media, without interfering with the look and feel of the printed object Other objects and advantages of the invention will become apparent as the description proceeds.

SUMMARY OF THE INVENTION

The present invention relates to a method for linking printed objects to electronic content, comprising:
a) providing at least one digital copy of a printed object to a server's database, wherein said digital copy represents at least portion of said printed object, wherein the content layout of both the digital copy and the printed object is the same;
b) providing association of at least one section at the layout of said digital copy with an electronic content, either by extracting and saving the coordinates of each link in the digital copy or via an external list of links;
c) processing said digital copy for distinguishing between two types of objects: text objects and non-text objects, wherein each text object represent at least portion of a word or a combination of at least two or more adjacent words in any orientation with respect to the plane of said printed object;
d) coding each object from both types of objects according to its visual shape and its reference location with respect to a defined coordinates on the layout of said printed object, thereby representing said digital copy as an array of vectors in a binary format;
e) creating clusters of similar binary vectors and assigning random array of characters to each of said clusters, and saving said array of characters as coded dictionary of "hashwords", thereby converting said binary vectors into a searchable text form;
f) capturing an image of at least portion of said printed object by a mobile device;
g) processing said captured image for distinguishing between text objects and image oriented objects, and coding each of said objects according to its visual shape and its reference location with respect to the layout of said printed object, thereby representing said captured digital image as an array of vectors in a binary format;
h) sending said array of binary vectors to said server via a communications network;
i) converting each clustered vectors to a hashword;
j) performing textual search for identifying the corresponding hashwords that essentially best match the haswords that were coded from the digital copy, wherein the conversion of said array into hashwords is done either locally in the mobile device prior to the sending or remotely at said server after the sending;
k) performing a geometrical matching among the best matches over the array of vectors that represent the captured image;
l) Calculating the location of the captured part on the best match digital copy and extracting the specific link aimed to by captured image; and
m) sending the associated electronic content or a corresponding link of it from said server to said mobile device.

According to an embodiment of the invention, the processing of the digital image comprising detecting the inter-line spacing and the inter-word spacing across the area of said digital image, and detecting the text and non-text areas in each line and determining word boundaries, thereby determining each text object and each non-text object.

According to an embodiment of the invention, the processing further comprises pre-processing the captured image by applying image processing algorithm(s) to a digital representation of said image. The pre-processing comprises performing different image manipulation and transformation corrections such as an image rotation for skew correction.

According to an embodiment of the invention, the method further comprises prior to the sending of the array of binary vectors, converting each vector from said array into a unique charters string ("hashwords").

In another aspect the present invention relates to a system adapted to perform the method for linking printed objects to electronic content.

In another aspect the present invention relates to a computer program comprising computer program code means adapted to perform the method for linking printed objects to electronic content when said computer program is run on a computer based device, such as an MMD or a server.

DETAILED DESCRIPTION OF THE INVENTION

Throughout this description the term "Mobile Media Device" or (MMD) is used to indicate a computer based device including but not limited to cellular phones, tablet computers, notebook computers and any other electronic device which includes a camera or other image capturing device.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The system of the present invention enables users of an MMD to capture an image of a printed object (e.g., the object can be at least a portion of a printed article) and to get in return a corresponding electronic content (e.g., a video clip, picture, text, link to a web page and the like).

Examples of the invention provide an image processing method in which the captured image is converted into an array of clustered vectors (refer herein as descriptors) that is based on the inter-line spacing and inter-word spacing of text and non-text objects, at samples across the area of the image.

Figure 1:
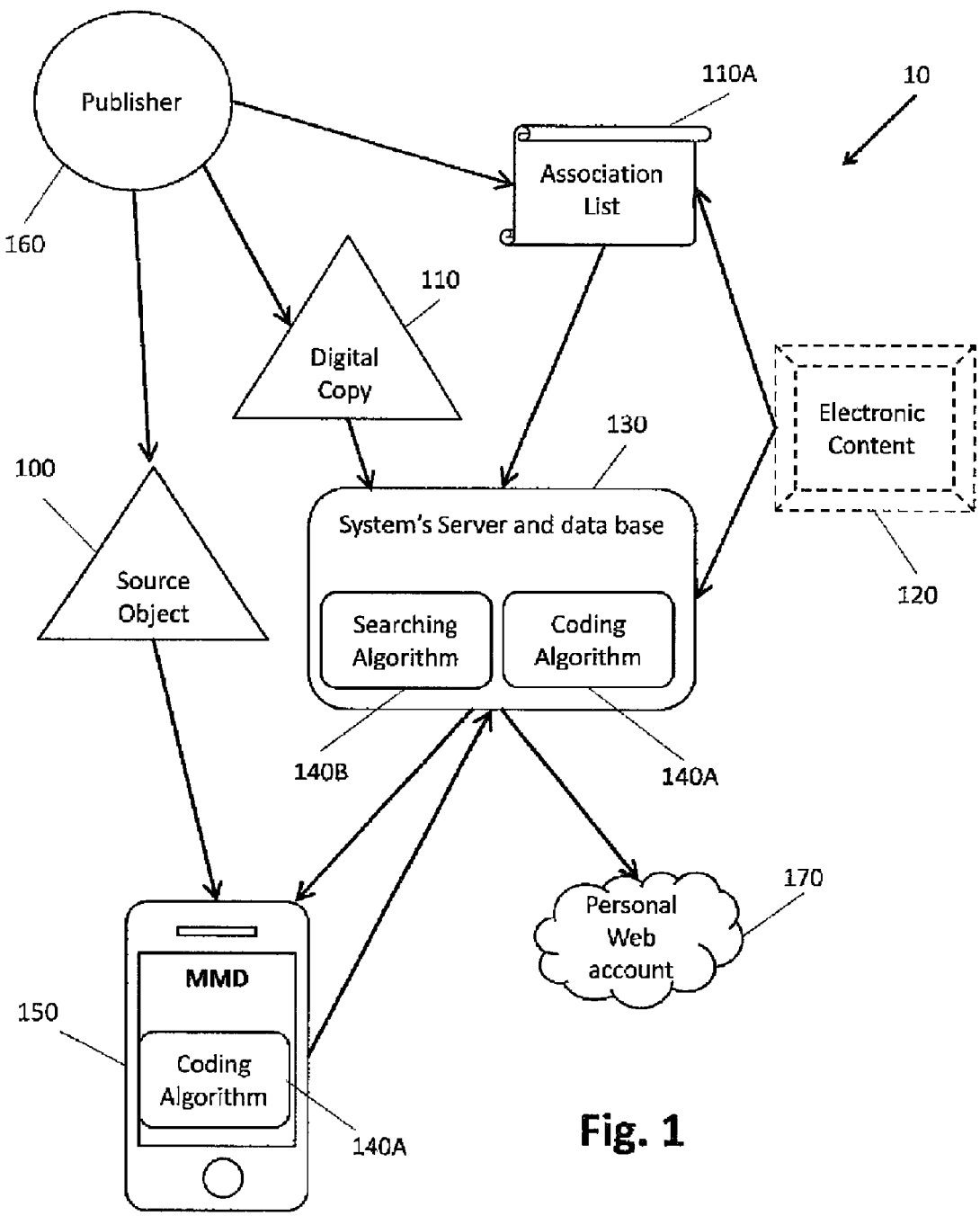
FIG. 1 is a block diagram generally illustrating a system for linking printed object with electronic content, according to an embodiment of the invention.

Aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a MMD, those skilled in the art will recognize that the invention may also be implemented in combination with other program modules.

FIG. 1 schematically illustrates a system 10 for linking printed object with electronic content in accordance with an embodiment of the invention. The system comprises an MMD 150 and a server database 130. The MMD 150 is provided with a designated MMD application (e.g., a client) that is adapted to capture an image of a source object 100 in order to get in return an electronic content 120 (e.g. a video clip, picture, text, a link to a web page and the like) that is associated with the captured image of the source object 100. Source object 100 can be any printed material, such as a book, a magazine, a brochure, etc.

A digital copy 110 (e.g., a PDF file format) of the source object 100 with the same layout of the source object 100 is stored in the server 130. In other words, the source object 100 is the printed version of the stored digital copy 110. The digital copy 110 may include a single image or a plurality of images, wherein, for example, each image may represent at least one page (or sometimes only a portion of at least one page) of a printed article, such as a book or a magazine. The links of the relevant electronic content 120 to the source object 100 can be pre-defined in an association list 110A. The association list 110A contains the linked object (word, sentence, picture, etc.) and its coordinates in a page and the URL of the digital content; or can be embedded as a hyperlink within the digital copy 110 of source object 100.

For example, one or more hyperlinks can be embedded in the digital copy 110 (e.g., in form of a PDF format) as provided by the publisher 160 of the digital copy 110. According to this example, the publisher 160 may send/upload the digital copy 110 (e.g., image(s) of source pages and the association list 110A) or a PDF file of the final layout with embedded hyperlinks to the server 130.

The digital copy 110 and the association list 110A are processed to extract the relevant characteristics for the source object 100. The processing includes: a. the extraction of links/hyperlinks from a PDF file or saving the association list 110A with their coordinates as should virtually appear in the source object 100, and b. the conversion of the digital copy 110 into descriptors and then to text string (i.e., hashword). This enables saving a smaller size file and later a faster search and comparison process as will be described in further details hereinafter.

At the MMD side, after the user takes a photo of the printed source object 100 with the MMD 150, the designated MMD application processes the acquired image and sends data that represent the result of the processing to the server 130. The designated MMD application includes a coding algorithm 140A that converts the acquired image into a coded form (descriptor). According to an embodiment of the invention, the processing transforms the captured image into a coded image that is defined by a plurality of clustered vectors, wherein each vector represents information of a portion from the taken photo. The method/algorithm for generating the coded image will be explained in further details hereinafter and also with reference to FIGS. 2 and 3.

At the server side, the system 10 uses the coding algorithm 140A to convert the pages layout of the digital copy into descriptors and 140B (similar to the processing done to the source object 100 by MMD 150) and a searching algorithm 140B that identifies and matches between an existing image of the source object 100 (i.e., the digital copy 110) at the server's database 130 and the coded image sent from the MMD 150, which may contain only some similarities with the source object 100 (e.g., only portion of the image, distorted, poorly lit, not in focus, etc.).

An additional advantage provided by the invention is the link extraction from the digital copy 110, in which the system 10 extracts the location of every link in or associated with the digital copy 110 form of the source object 100 (e.g. the coordinates of every link in a page). Upon finding a match between the digital copy of the source object 100 and the data sent from the MMD 150, any hotspot (i.e., coordinates) appears in that data can be matched with the corresponding link, and the relevant electronic content or link(s) to it can then be send to the MMD 150. For example, the MMD 150 can be used to show/display the electronic content to the user.

According to an embodiment of the invention, system 10 is provided with web account capabilities, thereby allowing users to open a personal user web account 170. For example, a link to the electronic content is also saved in the personal user web account 170 for a later use (e.g., re-play, share, comment, etc.).

Turning now to the image coding algorithm, wherein according to the present invention the image processing of the digital image is used for distinguishing between two types of objects in the image: text objects and non-text objects (e.g. pictures). In general, the same processing applies both to the captured image by the MMD 150 and to the digital copy stored in the server 130. However, due to its nature (i.e., due to MMD's camera angle, light condition, distortions, etc.), a captured image usually requires some pre-processing tasks prior to the coding process, which the digital copy is usually not needed, such as the alignment of the captured image due to the MMD's camera angle.

For the sake of brevity, however, the process of image coding that was found to yield the best results and examples will be described hereinafter. Although of course less precise results can be obtained using alternative algorithms and, furthermore, algorithms comparable to one described herein can be employed, all of which is encompassed by the invention.

Processing of a captured image by the MMD 150 may involve the following steps:
- Capturing an image of the source object 100 (e.g., a printed article) by the designated application of MMD 150. The designated may include a visual target frame (e.g., displayed on the touchscreen of a smart-phone while aiming the camera to capture an image) to help the user to take a photo of the region of interest with respect to the entire layout of a page;
- Processing the captured image, which may include common pre-processing tasks such as greyscale conversion, alignment of the image, etc. and the conversion of the captured image into a vector representation by an array of descriptors (i.e., into a coded image). The conversion includes the using of different algorithms for extraction of text descriptors and non-text descriptors from the captured image and the clustering of the extracted descriptors; and
- Sending the coded image to the server 130 for finding the electronic content associated with the captured image.

At the server 130, the received descriptor clusters from MMD 150 are converted to hashwords, using the same methodology and dictionary as the conversion of descriptors of the digital copy. Then a search is conducted in order to find the correlated part in the digital copy that matches the acquired image sent from the MMD, and then find the electronic content associated with the captured image target. In general, the search procedure may involve the following steps:
- Matching the hashwords of the captured image with the hashwords of stored digital copies;
- Finding link which coordinates matches the target frame as aimed by the user with MMD's application;
- Associating with relevant electronic content; and
- Sending the electronic content or its link to the MMD 150. For example, at the MMD 150 the user can play the electronic content, share the electronic content, or store the electronic content for later use.

Figure 2:
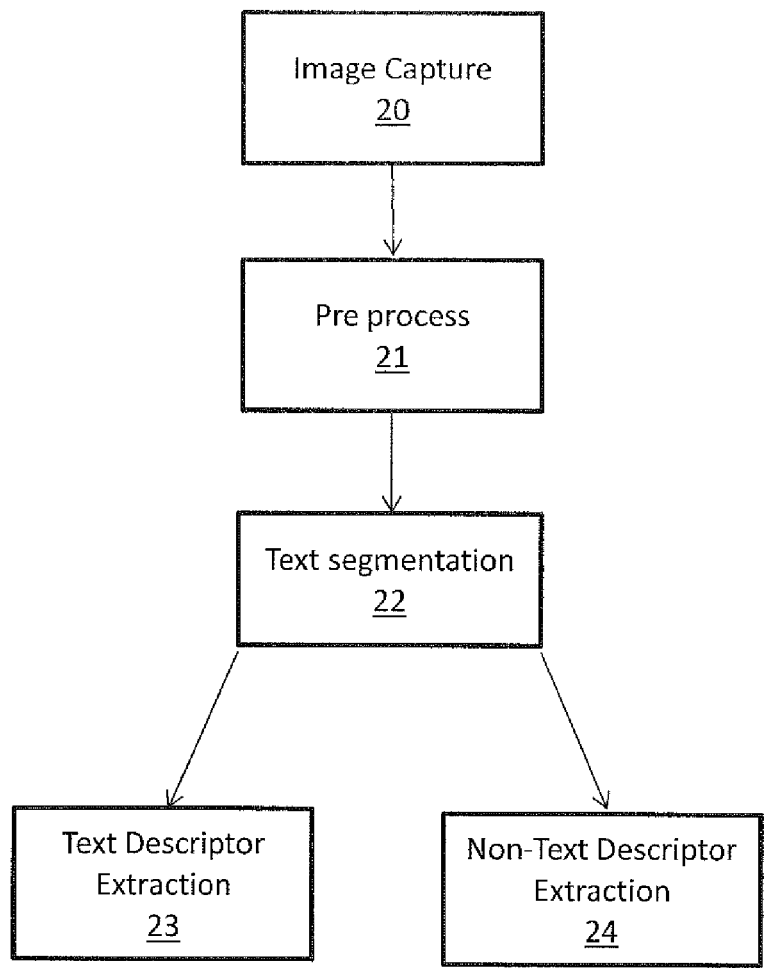
FIG. 2 is a flow chart generally illustrating the descriptors extraction process, according to an embodiment of the invention.

According to some embodiments of the invention, the captured image coding process may involve the following steps, as generally shown in FIG. 2:
- Capturing an image from a printed article (step 20);
- Pre-processing the capturing image (step 21), which may include common tasks such as greyscale conversion, alignment of the image, etc.;
- Applying segmentation process to separate text and non-text elements in the image (step 22); and
- Performing text and non-text descriptor extraction (steps 23 and 24) for converting each text object in the captured image into a vector representation.

The descriptors extraction process may involve the following steps:

A. Descriptor Extraction—Text Descriptors
1. Converting the captured image to grey level, if required;
2. Applying a deskew algorithm to the captured image for aligning horizontally text lines that appear in the captured image. The algorithm can be any deskew algorithm or equivalent, such as the public domain deskew algorithm provided by Leptonica Image processing library;
3. Applying image binarization to the deskewed image (e.g., by using the Sauvola method for local binarization);
4. Finding all blobs in the binarized image, wherein with respect to text objects in the image the blobs may represent words or part of words, and with respect to non-text objects the blobs may represent portions of a figure or other image object. Based on the inter-line and inter-word spacing in the captured image, an array of blobs are derived which represents the visual deployment of words in the captured image. The blobs may refer to a sort of a bounding box that may include curved or unsymmetrical outlines;
5. For each blob center, finding the distance in pixels to the blob center that is closest to it;
6. Calculating the median of the founded distances;
7. Applying morphological operation by closing with rectangular kernel of size f*median (e.g., f=2), wherein f is a tunable parameter of the application. The term closing refers herein to the operation of morphological noise removal, and as a result the closing operation causes close enough blobs to be fused together;
8. Finding again all blobs in the image after the closing operation. If there is enough text in the image (e.g., even 3 lines of text will suffice) whole words will be in a single blob;
9. Filtering small blobs and very large blobs, according to tunable parameters of the algorithm;
10. Calculating bounding box for each blob to be used as a mask between non-text objects (e.g., figures and images) and text areas;
11. Taking the binary deskewed image (i.e., the binarized image) and for each bounding box calculating the center of mass of the "on" pixels that appear in it;
12. For each Bounding box: finding the average distance (in x and y dimensions) of the "on" pixels in it from the calculated center of mass (wherein x=fwidth and y=fheight). In binary representation "1" refers to a black pixel (i.e., "on" pixel), while "0" refers to a white pixels (i.e., no pixel)
13. For each Bounding Box: calculating a new Bounding box centered in the calculated center of mass with width $f_x$*fwidth and height $f_y$*fheight, wherein $f_x$ and $f_y$ are tunable parameters of the algorithm;
14. Scaling bi-linearly each new Bounding Box to a fixed size image with $n_y$ row and $n_x$ pixels in each row; wherein $n_x$ and $n_y$ are tunable parameters of the algorithm; and
15. Flattening the scaled image to a vector row after row, wherein said flattened scaled image refers herein to the text descriptor.

B. Descriptor Extraction—Non-Text Descriptors:
1. Resizing the Deskewed gray level image (as obtained in step A.2 hereinabove) by a scale factor s*median (same as step see A.7 hereinabove), wherein s is a tunable parameter of the application;
2. Scaling the mask calculated in step A.10 hereinabove with respect to the resized image and applying the scaled mask to the resized image;

3. Extracting interest points by applying a corner detection algorithm such as the AGAST Corner Detector, and if an interest point falls inside the text area then discard it; and
4. For each valid feature point, extracting a binary descriptor by applying a keypoint descriptor algorithm such as the FREAK: FAST RETINA KEYPOINT algorithm, wherein this binary descriptor represents the image (non-text) descriptor.

Only one example of each of the different types of image processing has been given. Those skilled in the art will be aware that many different image processing techniques are available for detecting patterns within images, and of course text is simply an image pattern. Thus, there are many different processes for detecting which parts of an image are text objects and which are non-text objects.

According to an embodiment of the invention, in order to provide a rapid search procedure for finding the matching between captured images and the stored digital copy of the source object, the descriptors in the systems' server 130 as extracted from the digital copies are converted into a hashwords (string text) form. The hashwords are saved in a coded dictionary and enables to search the database of server 130 in a text form (by utilizing common search engines such as Goggle's search engine, SQL, and the like). The dictionary building procedure may involve the following steps for each Text Descriptor and Non-text Descriptor:

1. given a database of images (e.g., as provided in PDF file format of the digital copies), extracting all text descriptors from all the digital copies; and
2. clustering all descriptors by applying cluster analysis such as the hierarchical k-means algorithm for binary vectors;
3. assigning each cluster a random hashword (e.g., a 6-letter word); and
4. repeating the same procedure of steps 1-3 for the Non-text descriptors.

Figure 3:
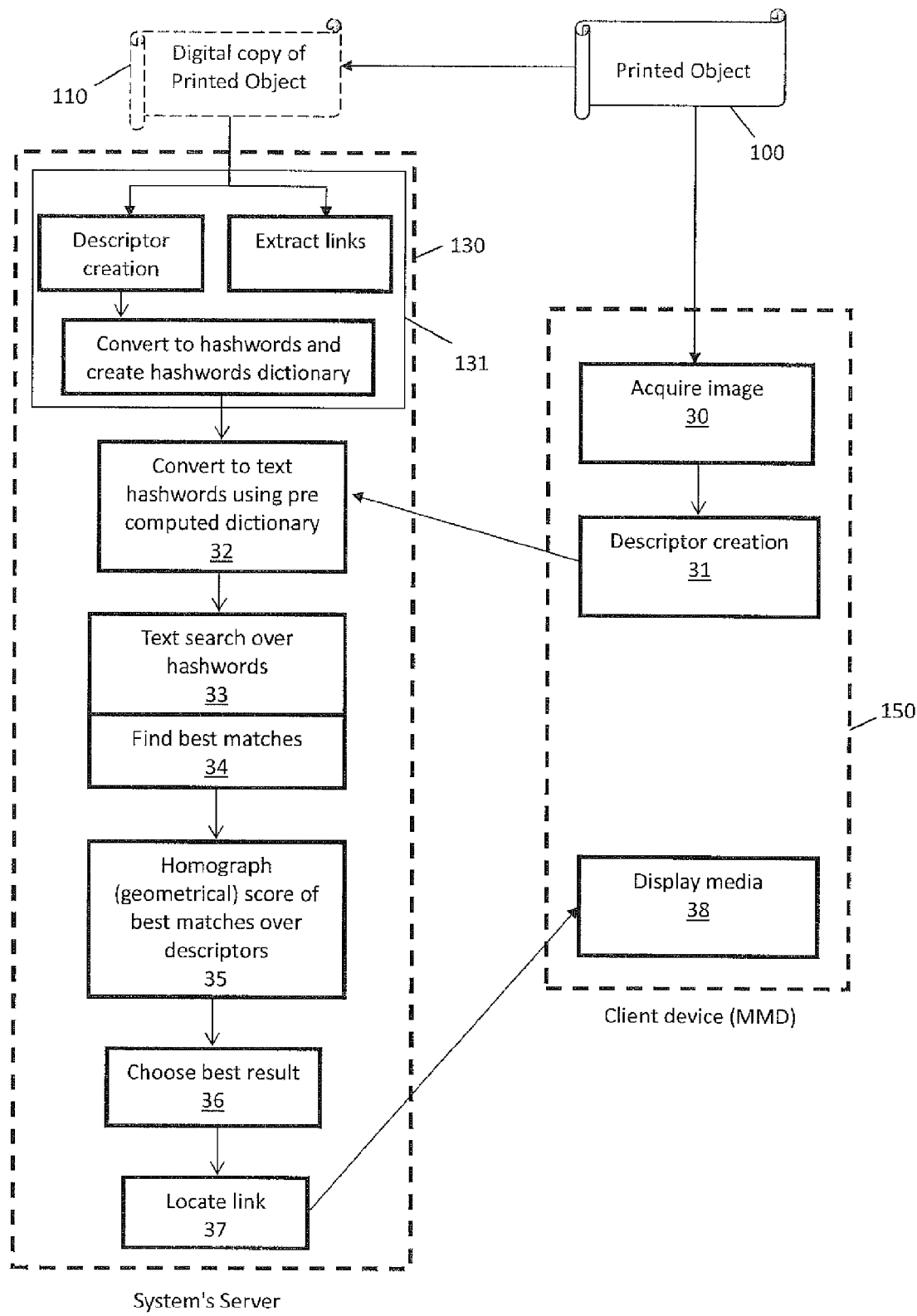
FIG. 3 is a flow chart generally illustrating the method of the invention.

Referring now to FIG. 3, a flow chart generally illustrating an embodiment for implementing the method of the invention for linking printed object with electronic content is now described. This method of this embodiment involves the steps of:

acquiring an image by an MMD 150 (step 30);
performing descriptors extraction for text and non-text objects within the acquired image (step 31) and sending the descriptors from the MMD 150 to the system's server 130;
converting each of the received descriptors into text hashword format using the aforementioned dictionary (step 32); the descriptor to hashword conversion is described hereafter in further details;
conducting a text search with the converted descriptors over hashwords that appear in the dictionary (step 33). As aforementioned hereinabove, the haswords appear in the dictionary were extracted from digital copies (such as digital copy 110) prior to the capturing of the image by the MMD 150 (such extraction process is generally indicated by numeral 131 in the figure);
Finding the best matches results for the conducted text search (step 34);
For each one of the best matches, performing a geometrical matching for providing a homograph score of best matches over descriptors (step 35). The geometrical matching refers to the task of matching the geometrical position of descriptors between the descriptors that represent the acquired image and the descriptors that represent each of the digital copies;
Selecting the best result according to the maximal matched number of descriptors (i.e., the highest homograph score—as described in further details hereinafter) between the acquired image and the digital copy among the best matches (step 36); and
For the selected best result, locating the associated link or electronic content (step 37) which was closest to the acquired image center and sending it to the MMD 150 (step 38).

Descriptor to Hashword Conversion Procedure:

For given a descriptor and the dictionary building procedure as described hereinabove—creating clusters of similar descriptors and assigning random array of characters (e.g., letters) to the clusters. Those groups of characters will be saved as coded dictionary of "hashwords".

Homography Scoring of Database Results

Given a query image and its descriptors (i.e., as extracted from the acquired image—the source object) and probable target image (i.e., of a digital copy) and its descriptors, find the maximal number of descriptors that fit a homography between the two images using an algorithm known as RANSAC Homography fitting from the well-known public domain openCV library. Wherein, it is assumed that the document (i.e., the digital copy) with the highest rank is most probably the right one.

According to an embodiment of the invention, a source object is marked in a way that a user will know that this object is supported by the technology of the present invention, e.g., by adding a visual indicator to the source object.

According to an embodiment of the invention, MMD application may also be enabled to select a portion of text object or non-text object to which the image processing is to be applied. This can be done by displaying an aiming element while operating the MMD's application for capturing an image from a printed object. For example, the aiming element can be in form of the target frame as aforementioned hereinabove.

As will be appreciated by the skilled person the arrangement described in the figures results in a system that allows to link an object such as a printed page, sign, billboard, an exhibit in an exhibition or a landmark to electronic content (e.g., an ad, company website, sales representative, textual information, coupon, or any other kind of visual and/or audio content).

The system of the present invention enables to add multiple links in any printed article (e.g. a word, a sentence, a picture, an ad etc.), much like the functionality of hyperlinks in a web page without compromising the look and feel of the printed article. In addition, the system of the present invention provides the ability to link existing print (without adding markers for the reader). In that case the system can only identify a printed page. For example, if there are several links that are refer to the printed page, the system will display several buttons in the MMD's application for the reader to choose from. As a result, many already printed objects such as old books as well as new one are provided with functionality similar to the hyperlink. It allows using as many links as possible in a page, just like in an online page, but without compromising the look and feel.

An additional advantage provided by the invention is the ability of linking a video content (e.g. commercials ads on a TV) to an electronic content. Using the invention the user is able to use a cell phone application to take a picture/clip of the program played on the TV and get the electronic content to the cell phone (e.g. a coupon, web site, sale info, direct purchasing). For example, in such case, the system's server will store video clips, and the system will match the frame captured with a frame in the clip.

Although the method has been described above in connection with images captured by an MMD camera, however, the image processing can be applied to images which have been provided by other image capture devices.

The method described above can be implemented as a computer program to perform the image processing functions. Thus, an apparatus for implementing the invention can comprise a computer which processes a digital image file to perform the image analysis and subsequent correction. Generally, program modules include routines, programs, components, data structures, and other types of structures that perform particular tasks or implement particular abstract data types. The invention is also practiced in distributed computing environments where tasks are performed by remote processing devices that are linked through a communication network. In a distributed computing environment, program modules may be located in both local and remote memory storage devices.

The functions described hereinabove may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

All the above will be better understood through the following illustrative and non-limitative examples. The example appearance and terminology as depicted and described herein, are intended to be illustrative and exemplary, and in no way limit the scope of the invention as claimed.

Figure 4:
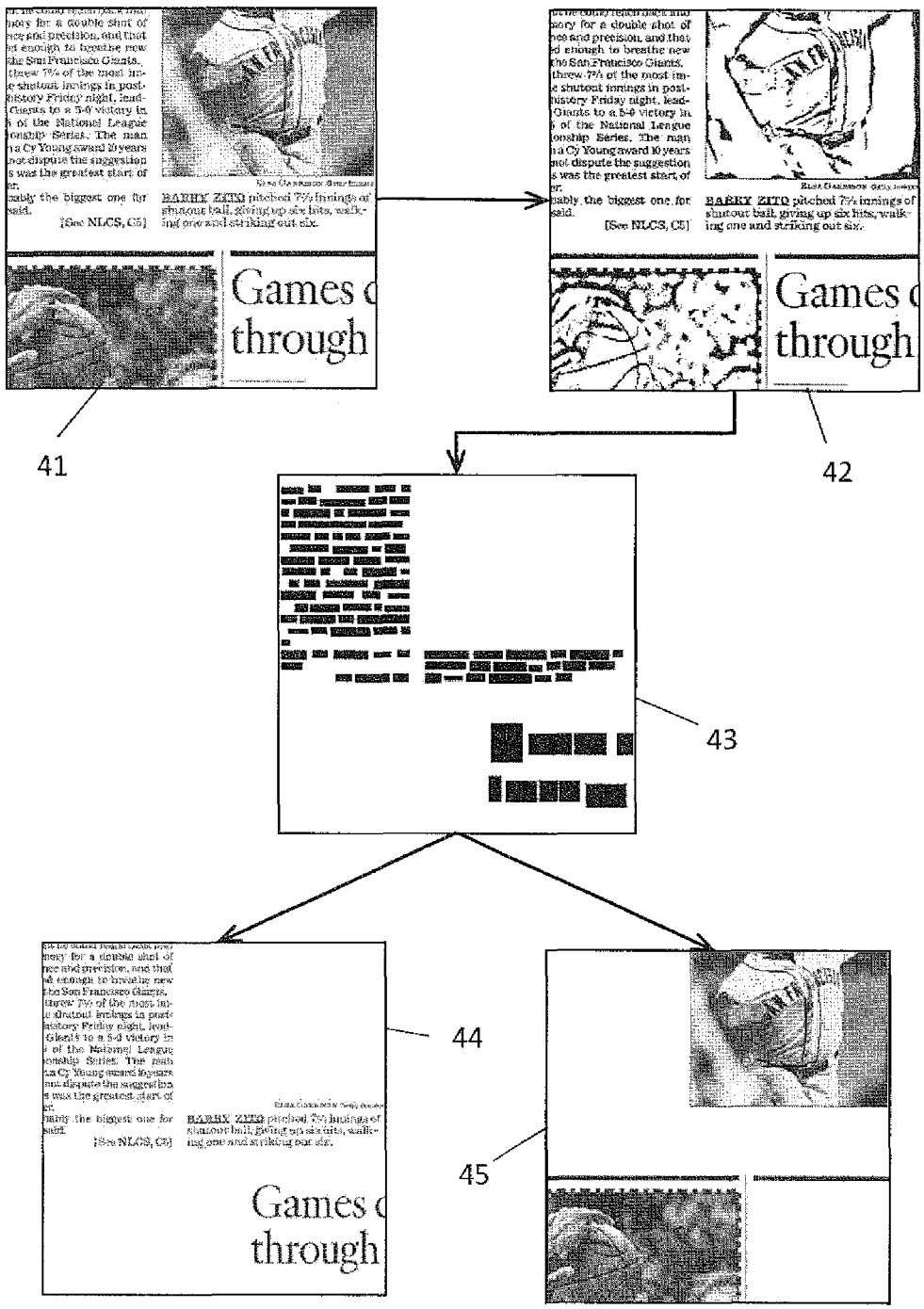
FIG. 4 generally illustrating an example of dividing an image into text and non-text segments, in order to apply different algorithm to each segment, according to an embodiment of the invention.

FIG. 4 shows an exemplary digital image of a source object that represents a printed layout of a page from a printed newspaper at different stages of processing, in accordance with an embodiment of the invention. The original digital image of the printed newspaper is indicated by numeral 41 (e.g., as acquired by an MMD). At the next processing stage, a binary representation of the digital image of the source object after applying the segmentation algorithm prior to extraction of text and non-text descriptors is shown (as indicated by numeral 42). At the next processing stage, each text object is represented by a bounding box form of at least portion of a printed word or a combination of at least two or more adjacent printed words in any orientation with respect to the plane of the printed layout (as indicated by numeral 43). At the next processing stage, the image is prepared for the extraction of the text and non-text descriptors, wherein numeral 44 indicates of the digital image that shows only the text objects, while numeral 45 indicates of the digital image that shows only the non-text objects. An example of the digital image of the source object after applying the segmentation algorithm and masking the text, preparing the non-text descriptors for extraction is indicated by numeral 45. An example of the digital image of the source object after applying the segmentation algorithm with the text objects, preparing the text descriptors for extraction is indicated by numeral 44.

In this embodiment, each text object is converted into an essentially quadrilateral form or bounding box, while words that contain letters that extend from the common virtual alignment line of each row results in corresponding higher from, such as the letters: b, d, f, g, h, k, l, p, q, t and y. Depending on the font attributes each different word (or portion of the word or combination of two or more words, depending on the line spacing, and inter-spacing between the words) may result in a unique form.

All the above description and examples have been given for the purpose of illustration and are not intended to limit the invention in any way. Many different mechanisms, methods of analysis, electronic and logical elements can be employed, all without exceeding the scope of the invention.

The invention claimed is:

1. A method for representing objects in searchable text form, comprising:
   a) providing at least one digital copy of an object wherein said digital copy represents at least portion of a layout of said object;
   b) processing said layout for distinguishing at least text objects in said layout, wherein each text object of a plurality of said text objects is represented by a bounding box associated with a visual form of at least portion of a word or a combination of at least two or more adjacent words in any orientation with respect to said layout;
   c) coding each of said plurality of text objects in a binary descriptor corresponding to its visual form in said layout, wherein said coding comprises determining a binary image of the bounding box of the text object; and flattening said binary image to form the binary descriptor representing the text object; and
   d) representing said layout in a binary vector being an array of the binary descriptors of at least said plurality of text objects arranged in accordance with locations of said text objects in said layout; and
   e) assigning text string hashwords to said binary descriptors, for converting said binary vector into a searchable text form based on the hashwords assigned to said binary descriptors.

2. The method according to claim 1, wherein the processing of the layout of the object comprises detecting an inter-line spacing and an inter-word spacing across the layout, and determining word boundaries associated with the text objects.

3. The method according to claim 1, further comprising pre-processing of an image indicative of the layout of the object, said pre-processing comprising: at least one of the following image processing algorithms applied to a digital representation of said image: an image rotation; skew correction; image binarization.

4. The method according to claim 1, wherein said providing of the at least one digital copy of the at least portion of the object comprises receiving an image of said at least portion of said object.

5. The method according to claim 1, further comprising sending data about said layout of the object to a server via a communications network, said data about the layout of the object being in the form of at least one of the following: the binary vector, and the searchable text form thereof.

6. The method according to claim 1, further comprising the conversion of the binary vector into the searchable text form thereof based on the hashwords assigned to the binary descriptors in the binary vector of the layout of the object, said conversion being carried out in a device receiving an image of at least a portion of the object or at a server connected to the device via a communication network.

7. The method according to claim 6, wherein the hashwords are respectively assigned to different clusters of the descriptors, each cluster corresponding to the same or similar descriptors.

8. The method according to claim 1, further comprising providing data indicative of an electronic content of at least a portion of the object represented by the searchable text form, and sending said data to a device, from which said at least one digital copy of at least portion of the object has been received in the form of the binary vector or the searchable text form thereof.

9. The method according to claim 8, wherein said providing of the data indicative of the electronic content of the object represented by said searchable text form comprises utilizing a database which stores searchable text forms representing objects; and a database comprising a list of links associating sections of the layout of the object with corresponding electronic contents.

10. The method according to claim 9, wherein said utilizing of the databases comprises:
   in response to received data about the layout of at least portion of the object, identifying the searchable text form thereof,
   performing textual search in the database of the searchable text forms to identify matching hashwords matching said searchable text form of the received data,
   determining the location of the portion of the object corresponding to said matching hashwords;
   performing a search in the list of links and identifying a section corresponding to said location and finding the corresponding electronic content.

11. The method according to claim 10, wherein said determining the location comprises: performing a geometrical matching of the matching hashwords, determining a best match, and calculating the location of the best match in the layout.

12. The method according to claim 1, wherein the processing of the layout of the object comprises distinguishing between text and non-text objects in said layout.

13. The method according to claim 1, wherein said determining of the binary image of the bounding box comprises bi-linearly scaling the bounding box of the text object to a fixed size binary image of $n_y$ rows and $n_x$ pixels in each row; and flattening said fixed size-binary image to form the binary descriptor representing the text object.

14. A computer program product comprising a non-transitory computer readable medium having computer readable computer program code configured to perform the method of claim 1 when said computer program product is run on a computer based device.

15. A server system connectable to devices via a communication network, said server system being configured as a computer-based system for linking objects to electronic content, said server system comprising:
   a database for providing searchable text forms of objects, each being created according to the method of claim 1 for the respective object and stored in the database; and
   an association list utility including a list of links associating one or more sections of said layout of the objects, which are represented by said searchable text forms, with respective electronic content; and
   non-transitory computer readable medium storing computer readable code for linking objects to electronic content in response to data indicative of a layout of an object received from a device via the network, by carrying out the following: identifying the searchable text form of the received data; performing textual search in the server database of the searchable text forms to identify matching hashwords matching said searchable text form of the received data, and determining a location of a portion of the object corresponding to said matching hashwords; performing a search in the list of links and identifying a section corresponding to said location and finding the corresponding electronic content; and sending said electronic content to the device via the network.

16. A device connectable to a server via a communication network, the device being configured as a computer-based device comprising:
   a non-transitory computer readable medium storing a designated application configured to receive an image corresponding to at least a portion of an object; and
   further comprising:
   a processor-based system for executing a coding algorithm for processing said image according to the method of claim 1 for providing data about the layout of said at least portion of the object being in the form of the binary vector or the searchable text form thereof, and sending said data about the layout of said at least portion of the object to the server via the communication network, thereby enabling receipt of an electronic content of said at least portion of the object from the server.

* * * * *